United States Patent [19]
McDonald

[11] 3,913,451
[45] Oct. 21, 1975

[54] HYDRAULIC CYLINDER WITH CUSHIONING MEANS

[75] Inventor: David Ian McDonald, Cincinnati, Ohio

[73] Assignee: Cincinnati Milacron Inc., Cincinnati, Ohio

[22] Filed: Aug. 30, 1974

[21] Appl. No.: 502,021

[52] U.S. Cl. .................. 91/396; 91/26; 92/166; 92/168
[51] Int. Cl.² .................. F15B 15/22; F16J 15/18
[58] Field of Search ............. 91/26, 394, 395, 396

[56] References Cited
UNITED STATES PATENTS

| | | | |
|---|---|---|---|
| 1,989,387 | 1/1935 | Vickers | 91/396 |
| 2,976,844 | 3/1961 | Goldring | 91/26 |
| 3,398,924 | 8/1968 | Lathrop | 91/396 |
| 3,704,650 | 12/1972 | Berg | 91/396 |
| R24,532 | 9/1958 | Halladay et al. | 91/394 |

*Primary Examiner*—Paul E. Maslousky
*Attorney, Agent, or Firm*—Daniel P. Worth

[57] ABSTRACT

A hydraulic cylinder-piston combination has a cushioning means for reducing velocity at the end of a stroke and is particularly applicable to the rod end of the cylinder where radial space on the packing nut or head may be at a premium for supporting an adequate cushioning means. The present cushioning means involves a pair of grooves separated by a land (inside one end of the cylinder head) and a ring on the piston rod. The ring and land hydraulically engage to form a restriction in the form of an annular passage. The grooves are, in turn, connected by obliquely or radially extending passageways with a check means therein. The arrangement compels hydraulic fluid to pass through the annular restriction formed by the ring and land when the two latter become hydraulically engaged near one end of the stroke but permit bypassing this restriction when the motion is reversed.

5 Claims, 3 Drawing Figures

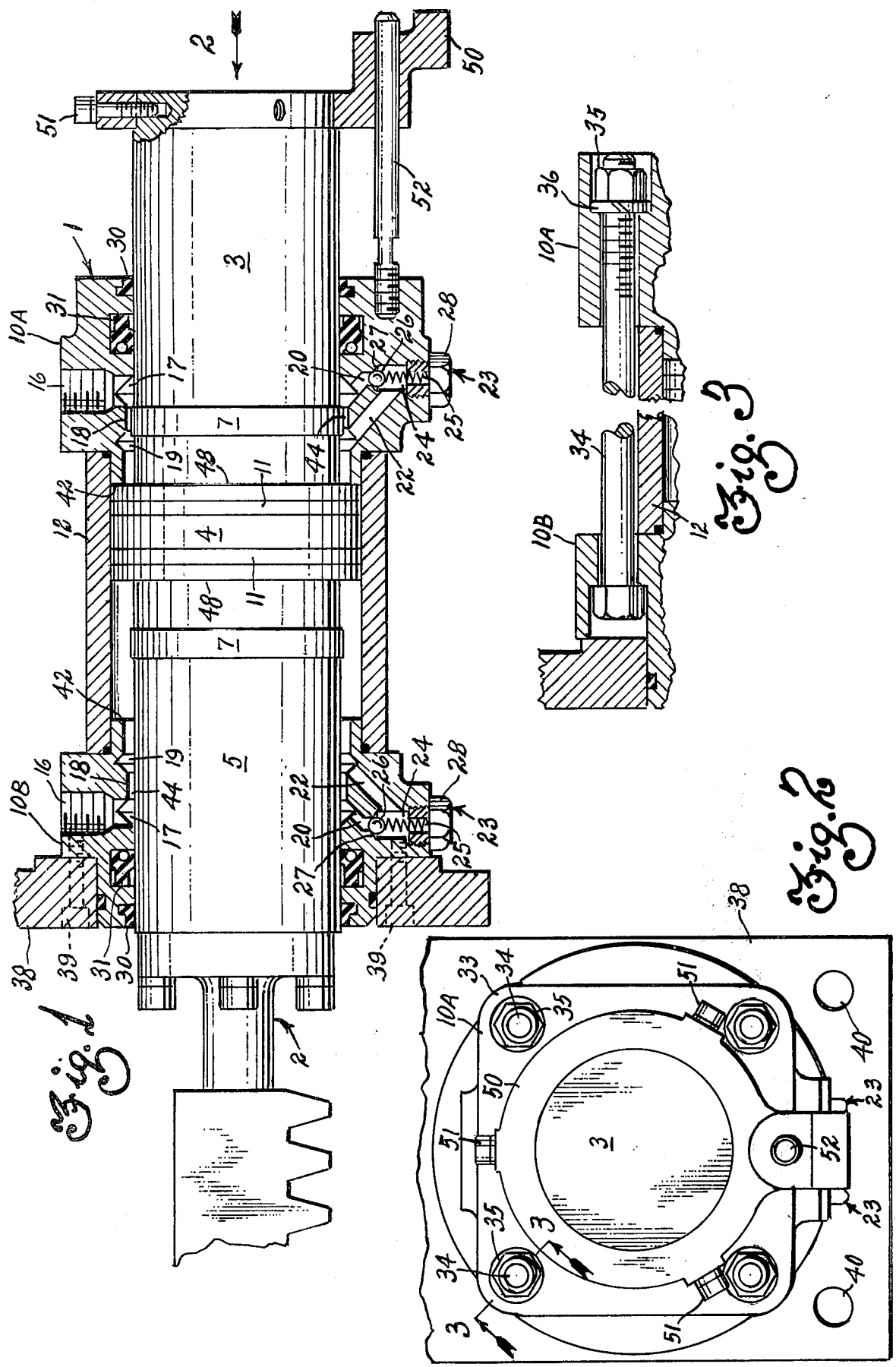

3,913,451

HYDRAULIC CYLINDER WITH CUSHIONING MEANS

BACKGROUND OF THE INVENTION

This invention relates to an improvement in hydraulic cylinder and piston assemblies having a cushioning means at one end of the stroke. One aspect of the invention relates to an improved cushioning means at the rod end of such cylinders where space for supporting a cushioning means is at a minimum in connection with which the invention by way of illustration will now be described.

The gland nut or head of a hydraulic cylinder through which the piston rod emerges has only a small clearance between the rod and cylinder wall (radial space or clearance) in which to support a satisfactory cushioning means, especially on some occasions, such as where an enlarged piston rod is used. The cushioning means, as is well known in the art, is employed to progressively reduce the velocity of the piston and rod relative to the cylinder as the end of the stroke is approached to thereby eliminate or reduce inertia forces. There are many designs of cushioning means in the art and their desirability for smooth shock free operation is also well known and appreciated.

Prior art cushioning means commonly require axially extending structures which are located in and take up substantial radial or diametral space. In the situation with which the present invention is concerned there is a minimum radial or diametral space (as with an enlarged piston rod) and, therefore, an arrangement is provided to allow a cushioning means that is disposed obliquely or substantially radially and which does not require an appreciable radial space to support its component parts. This in turn resolves some of the difficulties in providing a satisfactory cushioning structure on those occasions when the relative sizes of parts (e.g., an enlarged piston rod) make it difficult or impossible to employ a prior art cushioning structure, especially such structures consisting of drilled port holes around cushions.

One objective of the present invention is to provide an improved hydraulic cylinder assembly with cushioning means. Another objective of the present invention is to provide a hydraulic cylinder assembly having a cushioning means that requires very little if any radial or diametral space for its support. Indeed, the present structure is supported on the periphery of the hydraulic chamber or outwardly thereof, rather than being disposed internally and mounted on either the rod or on the cylinder head.

A hydraulic cylinder and cushioning means, according to the present invention, comprises the combination of the hydraulic cylinder, a piston mounted on a rod and reciprocatable within the cylinder in such a fashion that a chamber is defined between the head of the chamber (at one end of the cylinder) that decreases in volume as the piston moves toward the head and having in the chamber, preferably in the head, a pair of grooves separated by a land that is very carefully machined and has a predetermined diameter intermediate of the rod and piston diameters and with the outboard groove connected to the liquid supply and exhaust port. The piston rod has a ring thereon which is less than the land in diameter and which hydraulically engages the land to form an annular restriction. Passageways with a check valve therein are formed in the head at an oblique or substantially radial angle and connect the two grooves in such a way as to bypass the land and ring on those occasions when liquid is being admitted through the port for driving the piston away from the head but to close off flow through said passages when the piston is driving toward the head. The preferably application is to the rod end of the cylinder although the structure is suitable for application to both ends of a double acting cylinder. Plural passageways and check valve means are provided when increase flow area is required.

Other objects, advantages and features of the present invention, as well as those described above, will be appreciated from the following detailed description when read in conjunction with the attached drawings wherein;

FIG. 1 is a cross section assembly of a double acting piston and cylinder having an enlarged piston rod and containing an embodiment of the invention at each end;

FIG. 2 is an end view of the right end of FIG. 1; and

FIG. 3 is a partial section view along 3—3 of FIG. 2 illustrating a tie rod detail.

A double acting hydraulic piston and cylinder combination with a cushioning means according to the present invention has a hydraulic cylinder assembly 1 and a piston and rod assembly 2.

Since the cushioning means at each end of the cylinder assembly 1 are substantially identical, the same reference numerals are used to denote the same or similar parts and it is to be understood that operations described are likewise substantially identical.

The piston and rod assembly 2 illustrated is for a double acting cylinder with a tail rod 3 although it is to be understood that the cushioning means is equally applicable to other piston and cylinder arrangements known in the hydraulic art, such as double acting conventional arrangements without a tail rod, single acting, etc. The piston 4 is mounted on a rod 5. The rod 5 has a ring 7 on each side of the piston located where it can engage a corresponding land 18 on the cylinder head 10A, 10B and having a diameter less than that of the land 18 but greater than the diameter of the piston rod 5. The piston is fitted with a pair of suitable piston rings 11.

The hydraulic cylinder assembly 1 includes a cylinder body 12 located between a bottom head 10A and top head 10B. Each head has a radially extending port 16 through which hydraulic liquid is supplied under pressure and exhausted.

A part of the cushioning means is located on a diametral plane in the head to intersect said port and is an outer or first groove 17 preferably having a triangular cross section for ease of machining the groove and ease of drilling holes for the passageways described below. The land 18 spaces the first mentioned groove from a second inwardly located groove 19 which is also located on a diametral plane and preferably has a triangular cross section. Preferably the port grooves and land port 16, 17, 18, 19 are all situated on a head 10A, 10B so that they can all be machined on the same piece of material.

At least one but preferably a plurality of first (outer) 20 and second (inner) 22 passages which are located substantially radially - shown here obliquely - are connected respectively to the outer 17 and inner groove 19 to provide a bypass around the land 18 on those occasions when liquid is being admitted through the port 16.

A check valve means 23 consisting of a valve chamber 24 drilled into the head along a radius, a valve spring 25, a ball valve 26 and a valve seat 27 is formed between the two passages and has a plug 28 which closes off the check valve chamber as well as applying the requisite compression of the valve spring. The ball 26 is arranged to open when liquid moves from the outer 17, 20 to the inner 19, 22 passage and to slam shut or check when liquid moves from the innermost 19, 22 to the outermost 17, 20 passage.

The head 10A, 10B also contains a seal ring 31 and wiper ring 30 for engaging the piston rod 5 (or tail rod 3) in the usual manner. Each head has flanged portions 33 (FIG. 2) in which are supported tie rods 34 with the requisite nut 35, washers 36 (FIG. 3) and other fasteners for securing the assembly 1 together. In the illustrated embodiment, a support plate 38 is shown at one end and is also secured to the assembly by bolts 39 in the manner illustrated in FIG. 1. The various bolt holes 40 in the support plate can be used to attach same to machinery or support.

The inner shoulder 42 of each head provides a stop for the piston.

As noted above, a plurality of land 18 bypass means in the form of the outer and inner passages 20, 22 and their associated check valve means 23 may be provided, the exact number being determined by the volume and rate of liquid to be removed. When such a plurality is used, each pair of passages 20, 22 and associated check means 23 is connected between, and preferably equally spaced around, the inner and outer grooves 17, 19.

The ring 7 and land 18 cooperate when they come into engagement with each other during the terminal part of the stroke to form, in the radial clearance between them, an annular restriction 44 which progressively increases in length as the rod/piston approach the end of the cylinder and, therefore, progressively increases in its effect. This restriction becomes effective because the check valve assembly 23 closes off other exits from the chamber (a chamber being defined by the volume between a piston and head and decreasing in volume as the piston moves toward the head). The land 18, therefore, has a diameter slightly larger than that of the ring 7 but less than that of the piston. The ring 7 has a diameter greater than that of the rod 3, 5 but sufficiently less than the land 18 diameter to provide the clearance for annular restriction 44.

Operation will be described through a cycle of supply and exhaust of liquid from the chamber at one end of the cylinder-piston combination it being understood that like events occur at the other end. As to exhaust, assume for purposes of illustration that the piston assembly 2 is moving toward the left as illustrated in FIG. 1. This, of course, would be under the impetus of hydraulic liquid supplied under pressure through the right end port 16. The motion toward the left forces the body of liquid ahead of the left face 48 of the piston and out through the left-hand port. During the initial portion of the stroke the liquid moves through the clearance between the land 18 and rod 3, 5 into the outer groove 17 thence peripherally and out of the port 16. However, when the ring 7 comes into engagement with the land 18 it immediately creates a severe annular restriction 44. The pressure and flow direction of the liquid exhausting through the left port 16 has, in the meantime, closed the check valve means 23 so that no flow takes place from the inner 19, 22 to the outer passages 17, 20. The hydraulic engagement of the ring and land create an annular restriction through which the exhausting hydraulic must now travel. This restriction increases in length up to the limit of the ring-land engagement and, therefore, in effect as the piston continues to the terminal end of its stroke.

As to the supply events, the invention bypasses the restriction. Now lets assume that the piston 2 is to be moved from the right cylinder as illustrated in FIG. 1. Liquid is supplied under pressure through the port 16, travels peripherally through the outer groove 17, and upon hitting any one and all of several outer passages 20, travels through them to the check valve 23, opens the check valve and then enters the second passageway 22 and second groove 19 and is thereby applied against the active face of the piston. In this manner the check valve 23 bypasses the annular restriction 44 so that a rapid pressure buildup against the piston is achieved.

An alignment bracket 50 is secured by a setscrew 51 or other suitable means to one extreme end of the piston and slidably receives and engages an alignment pin 52 which in turn is screwed into one of the cylinder heads. This arrangement prevents the cylinder rod from turning on those occasions where turning is not desirable. Obviously it could be eliminated where turning of the rod and piston would be of no detriment to the operation of the system.

In an actual embodiment of the invention employing a 3 inch diameter rod in a 3½ inch diameter cylinder (leaving only one-quarter inch radial clearance) and double acting, as illustrated in FIG. 1, a clearance of 0.003 inches (0.08 millimeters) on the radius or 0.006 inches on the diameter it was provided between the ring and land. Two of the passagecheck valve means described for bypassing the ring and land were provided at each end; i.e., two check valves and two outer passages were connected to each outer groove. The ring and land had a full engagement of a quarter of an inch; i.e., they overlapped each other by a quarter of an inch when the piston was at one end of the cylinder. Actual tests showed that velocity was reduced from 12 inches per second to 2 inches per second over the quarter of an inch.

The invention claimed is:

1. A hydraulic piston and cylinder having a cushioning means at one end thereof comprising the combination of
   a hydraulic cylinder with a head at one end having a port for flow of liquid into and from said cylinder;
   a rod extending axially of said cylinder and through said head;
   a piston fixedly mounted on said rod and reciprocable in said cylinder
   said piston and head defining therebetween a chamber that decreases in volume responsive to said piston and rod moving in unison toward said head;
   first and second peripheral grooves respectively located on the inner cylinder walls of said chamber respectively located to connect to said port and located between said port and said piston;
   a land disposed between said first and second grooves with a predetermined diameter intermediate the respective diameters of said rod and piston;
   a first passage in said head connected to said first groove;

a second passage in said head connected between said second groove and said first passage;

check valve means to prevent flow between said second and first passages; and a ring formed on said rod having a preselected diameter greater than the rod diameter and less than the land diameter and an axial length and forming an annular restriction when axially moved into engagement with said land whereby said annular restriction increases in length and cushion effect as said piston is moved toward said head.

2. A hydraulic piston and cylinder combination according to claim 1 wherein said first and second passages extend at least substantially radially outwardly of said grooves.

3. A hydraulic piston and cylinder combination according to claim 1 that further comprises a cushion means at the other end of said cylinder constructed in like manner.

4. A hydraulic piston and cylinder according to claim 1 that further comprises each of said grooves having a substantially triangular cross section and wherein each of said passages lies along an axis that is substantially perpendicular to one of the sides of that groove to which it is connected.

5. A hydraulic piston and cylinder combination according to claim 1, having in said head a plurality of said first passages which are spaced apart around said first groove, a corresponding plurality of said second passages within said head each connecting one of said first passages to said second groove, and a corresponding plurality of said check valve means each connected between one of said first passages and one of said second passages.

* * * * *